US012645715B2

(12) United States Patent
Kipfer et al.

(10) Patent No.: US 12,645,715 B2
(45) Date of Patent: Jun. 2, 2026

(54) SYSTEM FOR THE EXTRACTION OF INFORMATION FROM DOCUMENTS

(71) Applicant: Zurich Insurance Company Ltd., Zürich (CH)

(72) Inventors: Kevin Kipfer, Uznach (CH); Gero Gunkel, Basel (CH)

(73) Assignee: Zurich Insurance Company Ltd., Zurich (CH)

( * ) Notice: Subject to any disclaimer, the term of this patent is extended or adjusted under 35 U.S.C. 154(b) by 0 days.

(21) Appl. No.: 18/850,287

(22) PCT Filed: Mar. 24, 2023

(86) PCT No.: PCT/EP2023/057585
§ 371 (c)(1),
(2) Date: Sep. 24, 2024

(87) PCT Pub. No.: WO2023/180504
PCT Pub. Date: Sep. 28, 2023

(65) Prior Publication Data
US 2025/0077554 A1 Mar. 6, 2025

(30) Foreign Application Priority Data
Mar. 25, 2022 (EP) ..................................... 22164305

(51) Int. Cl.
*G06F 16/3332* (2025.01)
*G06F 16/31* (2019.01)
*G06F 40/40* (2020.01)

(52) U.S. Cl.
CPC ........ *G06F 16/3332* (2019.01); *G06F 16/316* (2019.01); *G06F 40/40* (2020.01)

(58) Field of Classification Search
CPC .... G06F 16/3332; G06F 16/316; G06F 40/40; G06F 40/44; G06F 40/20
See application file for complete search history.

(56) References Cited

U.S. PATENT DOCUMENTS

| | | | | |
|---|---|---|---|---|
| 2023/0019211 A1* | 1/2023 | Wang | ................... | G06N 3/0464 |
| | | | | 707/737 |
| 2023/0022845 A1* | 1/2023 | Meng | .................... | G06Q 10/10 |
| | | | | 707/737 |
| 2023/0267285 A1* | 8/2023 | Wu | ........................ | G06F 40/166 |
| | | | | 704/2 |

FOREIGN PATENT DOCUMENTS

EP 3862889 A1 8/2021

OTHER PUBLICATIONS

F. Zhu et al., "Retrieving and Reading: A Comprehensive Survey on Open-domain Question Answering", arxiv.org, Cornell University Library, 201 Olin Library Cornell University Ithaca, NY 14853, Jan. 4, 2021.

(Continued)

*Primary Examiner* — Yuk Ting Choi

(74) *Attorney, Agent, or Firm* — Dergosits & Noah LLP; Todd A. Noah

(57) ABSTRACT

The invention pertains to a system for the extraction of information from documents, in particular natural language documents, the system comprising an encoder with a neural network; and a retriever that is configured as a reasoning engine. The system is configured such that it supports user-defined queries for at least two pieces of information; the encoder is applied to the documents, in particular the natural language documents, to generate document encodings; the user-defined queries, to generate encoded instructions; the document encodings are queried by the retriever in lookup steps based on the encoded instructions.

10 Claims, 4 Drawing Sheets

(56)          References Cited

OTHER PUBLICATIONS

S. Singh, "The NLP Cookbook: Modern Recipes for Transformer based Deep Learning Architectures", arxiv.org, Cornell University Library, 201 Lin Library Cornell University, Ithaca, NY 14853, Mar. 23, 2021.

International Search Report Corresponding to PCT/EP2023/057585 mailed Jun. 5, 2023.

Written Opinion Corresponding to PCT/EP2023/057585 mailed Jun. 5, 2023.

* cited by examiner

SYSTEM FOR THE EXTRACTION OF INFORMATION FROM DOCUMENTS

This application is a National Stage completion of PCT/EP2023/057585 filed Mar. 24, 2023, which claims priority from European patent application no. 22164305.9 filed Mar. 25, 2022.

BACKGROUND OF THE INVENTION

Machine learning models based on deep learning are probably the most advanced models that are available today, powering e.g. self-driving cars to fake news detection on social media. However, these models are very big, making them computationally heavy. Often the model architectures work well in in a research setting but are not practical for industry use cases because they are very slow.

More specifically, in natural language processing (NLP) using algorithms that read and understand text, state of the art models that use transformer architectures leverage so-called windows to extract information from underlying text files. For each task (i.e., the information one wants to extract) a sliding window is used that goes over the whole document, analysing between 200-500 tokens (words) and doing a prediction for each window until the whole document is fully analysed. For each window and for each task the whole model must be re-run completely from scratch. Thus, many model iterations are required to process a single document. Such an approach works well if there is just one task to complete, or a very short document to analyse.

However, in most real-world scenarios there are multiple tasks to complete (i.e., entities or parameters to extract). For example, to automatically process a claim in the insurance business, one needs to extract information such as: (1) what is the claimant's name? (2) What is the defendant's name? (3) When did the damage happen? (4) How much damage was created? What is more, actual use cases require analysis of multiple different documents; e.g., a standard Commercial Insurance submission has about five large attachments per email submission.

For each of the above-mentioned tasks one would have to create a new window that needs to go through the complete content of a case, i.e. all documents. This is in particular a problem for many real-world use cases where one needs to extract typically thirty or more facts or information to achieve a meaningful level of process automation.

However, the issue is that extracting thirty facts or pieces of information takes thirty times longer than extracting just one parameter when using a sequential, window-based approach. For a real-world use case this may mean that the machine learning model needs seventy minutes or longer to analyse, e.g., a single customer email, which is obviously impractical when considering the huge number of emails received.

In theory, windows could also be run in a parallel fashion through the documents, to speed up the process. However, the computational resources to do this are so large, given that the computations scale linearly with each task, that this is not a viable option today for implementation in an industry setting.

This situation is a major obstacle for intelligent automation of document, in particular natural language document, processing across many industries. Consequently, there is a clear need for deep learning models that can extract information from documents in a different way.

SUMMARY OF THE INVENTION

It is thus an object of the present invention to provide an improved system for the automation of document, in particular natural language document, processing, wherein the system in particular requires less computational resources and allows for quicker analysis to be performed.

Towards this end, a first aspect of the invention pertains to a system for the extraction of information from documents, in particular natural language documents. The system comprises:

i) an encoder with a neural network; and
  ii) a retriever that is configured as a reasoning engine.

More specifically, the system is configured such that it supports user-defined queries for at least two pieces of information.

Further, the system is configured such that the encoder is applied to both the unstructured data of documents, in particular natural language documents, to generate document encodings; and the user-defined queries to generate encoded instructions.

Yet further, the system is configured such that the document encodings are queried by the retriever in look-up steps based on the encoded instructions.

The encoder may be, and preferably is contained multiple times in the system. This way, multiple encodings can be run in parallel, as will be explained in more detail below. More specifically, multiple encoders (more than two, preferably more than five, more preferably more than ten) can be applied in parallel to the documents, in particular to the natural language documents; preferably, the multiple encoders are all of the same kind. This greatly facilitates scalability, reduces the required computational resources for specific tasks and allows for quicker analysis. The encoders can also be of different kinds, with each encoder being specifically adapted for encoding a particular file type, for example.

Preferably, the neural network of the (multiple) encoder(s) is a transformer model.

The retriever is a reasoning engine that searches for information that is most relevant to a given instruction, and then reasons over the findings, as will be outlined in more detail below.

By way of example, documents for use with the system can be videos, sound files, images, diagrams, plots or natural language documents. A document does not necessarily have to contain text. It is also possible that objects, shapes, colours, shading or the like represented in image files are encoded. Likewise, data can be encoded in diagrams in an image file, for example. At the same time, a document can be a sound file in which a cough is encoded as such, for example. This information contained in images, videos and sound files can then be used for further processing in the same way as language information.

By way of example, natural language documents for use with the system can be e-mails (such as msg format), text files (such as txt or doc format), database files, portable document files (PDFs) or any kind of ocr'ed text. It is also possible that natural language documents are image files or sound files containing written or spoken natural language.

A single document may also contain both textual and nontextual information.

If multiple encoders are contained in the system, each encoder is preferably configured to encode a particular input type. In the context of the invention, one may, for instance, provide encoders that are specialised to encode text files, and other encoders that are specialised to encode sound files. Because a large variety of file types can be encoded, less information gets lost.

In a system according to the invention, the user can define an instruction that defines what the model shall extract. The retriever is then transforming this into a reasoning task for the machine learning model which then e.g. mines through the input document(s) to:

(a) identify relevant text passages with repeated look-ups across the whole document(s);

(b) compare and contrast the text passages to identify what can be disregarded, combined, etc.; and (c) determine the answer to the question.

The system architecture thus allows for a radical departure from how other (transformer-based) machine learning models for extraction tasks reason today over documents to solve question/answer tasks.

First, current architectures are forced to limit the amount of information to be included in their reasoning. They either reason per local window (e.g., Bert QA that uses a sliding window approach) or they introduce separate scorers that select a set of candidate sentences that are then fed into some other independent model. With such approaches, a lot of useful information is lost. In contrast, the retriever in the system according to the invention can do look-ups and reasoning across the whole text input, which prior art models cannot do. The model in the system according to the invention does the reasoning across the whole document per task (question) and not per text segment. What is more, the model in a system according to the invention can be trained end to end, i.e., the retriever, the encoder and the generator can share information during the training and actual information retrieval. Prior art models train each component separately, resulting in slower training time, duplication and a loss of information.

Secondly, other transformer based extraction models do not scale very well when applied to long documents and/or a large number of tasks. In a system according to the invention, however, since the pre-processing of the input and the actual task-dependent analysis are decoupled, many extractions can be done in parallel. The system architecture makes it possible to only process the input once, while other prior art extraction models would need to rerun the document again and again, creating an inefficient process.

Thirdly, other prior art extraction models do not combine an encoder, a retriever and a generator (as outlined further below) to work together in order to solve extraction tasks. It appears that there are only extraction models available today that combine an encoder with a simple scorer, lacking the reasoning capabilities of the retriever and in particular the natural language output capabilities of the generator.

Fourthly, it appears that prior art extraction models predefine the tasks and then train the models on data to learn the underlying patterns in order to solve the task. In order to learn a new task, the complete training must be re-run from scratch. However, in a system according to the invention, the task specification approach enables the model to solve an extraction task from scratch without re-training the complete model.

In preferred embodiments, as explained already above, the system is configured such that the retriever is only used once for each encoded instruction. This is in stark contrast to the repetitive nature of current extraction models.

It is further preferred that the system is configured such that the document encodings are generated only once, for the document encodings to be queried by the retriever to answer the user-defined queries for the at least two pieces of information.

In preferred embodiments, and as will be explained in more detail in the embodiments hereinbelow, the system is configured such that the retriever i) in the look-up steps searches for information that is most relevant for encoded instructions;

ii) reasons over the findings of the look-up steps; and iii) produces a condensed representation of the output of step ii).

In yet further preferred embodiments, the system is configured such that that steps i) and ii) may be repeated for each encoded instruction before the condensed representation of the output is produced in iii).

In further preferred embodiments, the system is configured such that the retriever produces a query that can be used to search for yet missing information, e.g. by way of multi-hop reasoning.

In yet further preferred embodiments, and as will be explained in more detail in the embodiments hereinbelow, the system comprises a generator that creates a response to the user-defined query based on the output representation of the retriever. The response is preferably not just the extracted text or non-textual information, but rather a semantic response. Suitable semantic question answering machines that can be used as such or easily adapted for use in the context of the present invention are known in the art, e.g. Albert.

Preferably, as already outlined above with respect to the retriever, the system is configured such that the generator is only used once for creating a response to each encoded instruction.

Yet another aspect of the invention relates to a computer-implemented method for extraction of information from documents, in particular natural language documents, based on user-defined queries for at least two pieces of information, in particular with a system as outlined above in general terms and exemplified hereinbelow. The method comprises the steps of:

i) Providing at least one document, in particular at least one natural language document;

ii) Applying an encoder with a neural network, in particular a transformer model, to a. the document(s), in particular the natural language document(s), to generate document encodings; and b. the user-defined queries, to generate encoded instructions;

iii) Querying the document encodings by a retriever in look-up steps based on the encoded instructions, wherein the retriever is configured as a reasoning engine.

The system and the computer-implemented method as outlined above offer a wide range of benefits, including:

Cost savings. The time spent by humans to read and re-key information from files (PDFs, emails, word docs, ppt etc.) into core systems is reduced, cutting manual work.

Speed advantages. Large documents can be read within seconds, enabling service providers to respond quicker Consistent decision making. Algorithms demonstrate more consistent decision making with lower noise levels (unwanted variance) for inbound inputs. This improves the overall quality of the process vis-à-vis a process that is fully relying on human judgement/manual work.

Management of peak loads. A (semi)-automated process to handle inbound traffic makes handling of workload peaks easier.

New data insights cases. The system architecture is able to turn unstructured data at scale into structured data. For example, one can run thousands of PDF documents through the system key value pairs for each document (e.g., names, addresses, premium values, deductibles dates etc.) as output that can be stored in tabular data. In such data structure the information can then be used for classical statistical analysis.

BRIEF DESCRIPTION OF THE DRAWINGS

The invention will now be described by way of more specific embodiments. These embodiments are not intended to limit the gist of the invention in any way, but rather serve to ease understanding of the invention.

DETAILED DESCRIPTION OF THE PREFERRED EMBODIMENTS

Figure 1:
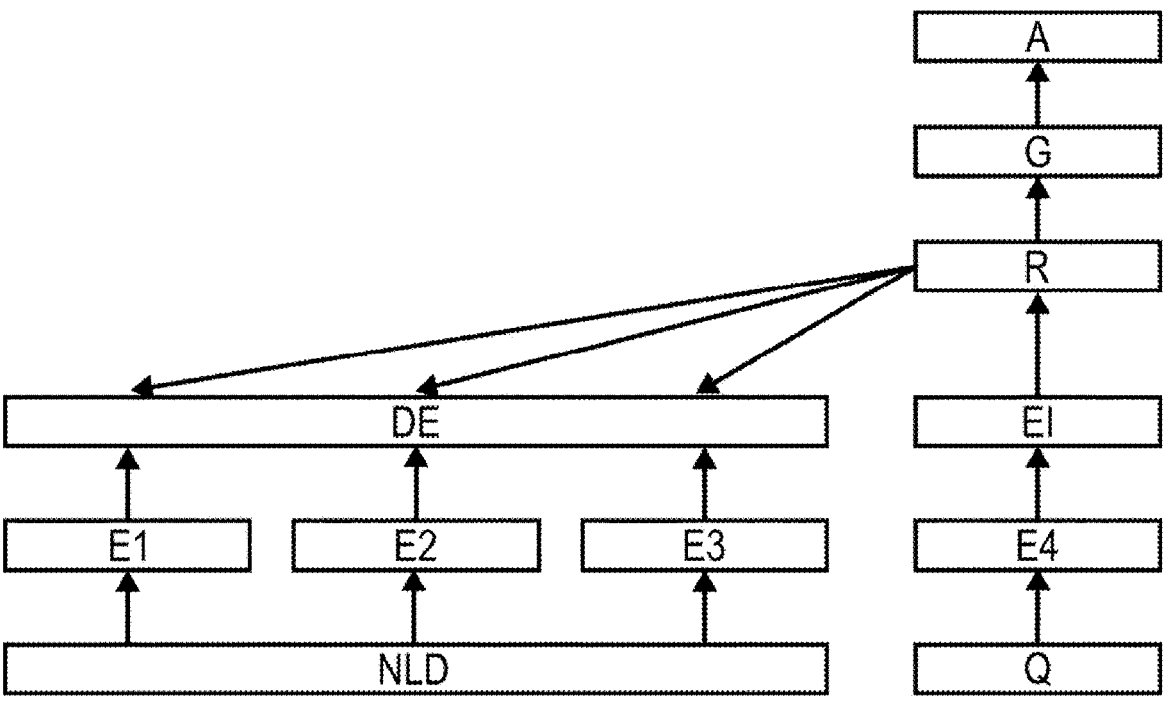
FIG. 1: Overall model architecture.

As outlined in FIG. 1, according to an exemplary overall model architecture, a natural language document (NLD) is provided as the information source. Encoders ($E_1$, $E_2$, $E_3$) run through the natural language document (NLD) and generate document encodings (DE)/vectors (V), such as e.g. keys and values. Further, the system comprises yet another encoder ($E_4$) that receives user-defined queries ($Q_1$, . . . ) and generates encoded instructions ($EI_1$, . . . ) therefrom. The document encodings (DE) are then queried by the retriever (R) in response to the user-defined queries ($Q_1$, . . . ) and their respective encoded instructions ($EI_1$, . . . ).

Figure 2:
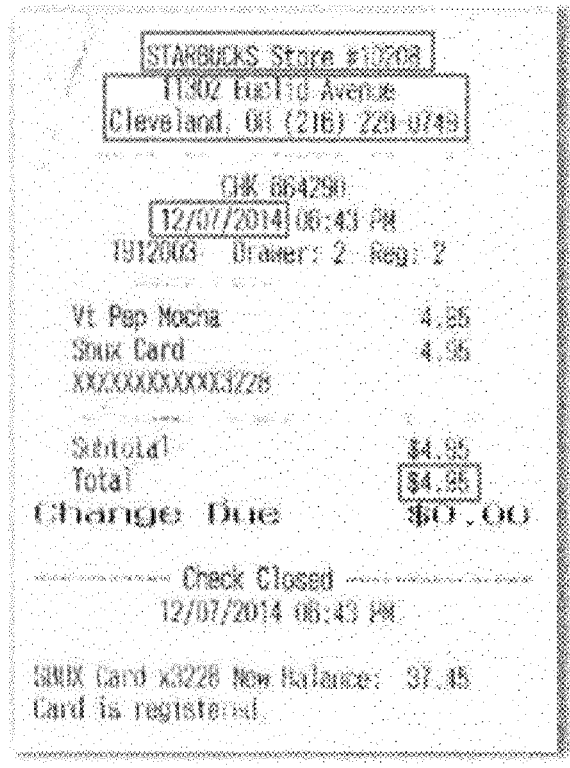
FIG. 2: Exemplary document understanding task.

FIG. 2 shows a sales slip, by way of example, as an input document for a document understanding task. From top to bottom, the following information (answers) can be deducted from the boxed areas of the sales slip:

| Query | Answer |
| --- | --- |
| "company" | "STARBUCKS STORE #10208" |
| "date" | ""Dec. 7, 2014" |
| "address" | "11302 EUCLID AVENUE, CLEVELAND, oh (216)229-0749" |
| "total" | "4.95" |

Figure 3:
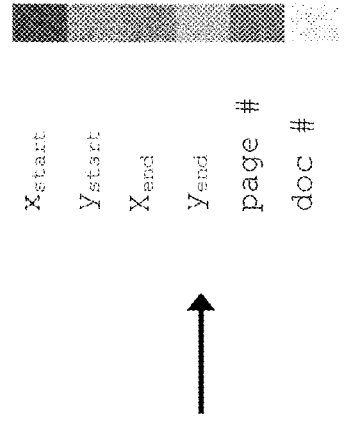
FIG. 3: Exemplary position embedding (bounding boxes)
Figure 3:
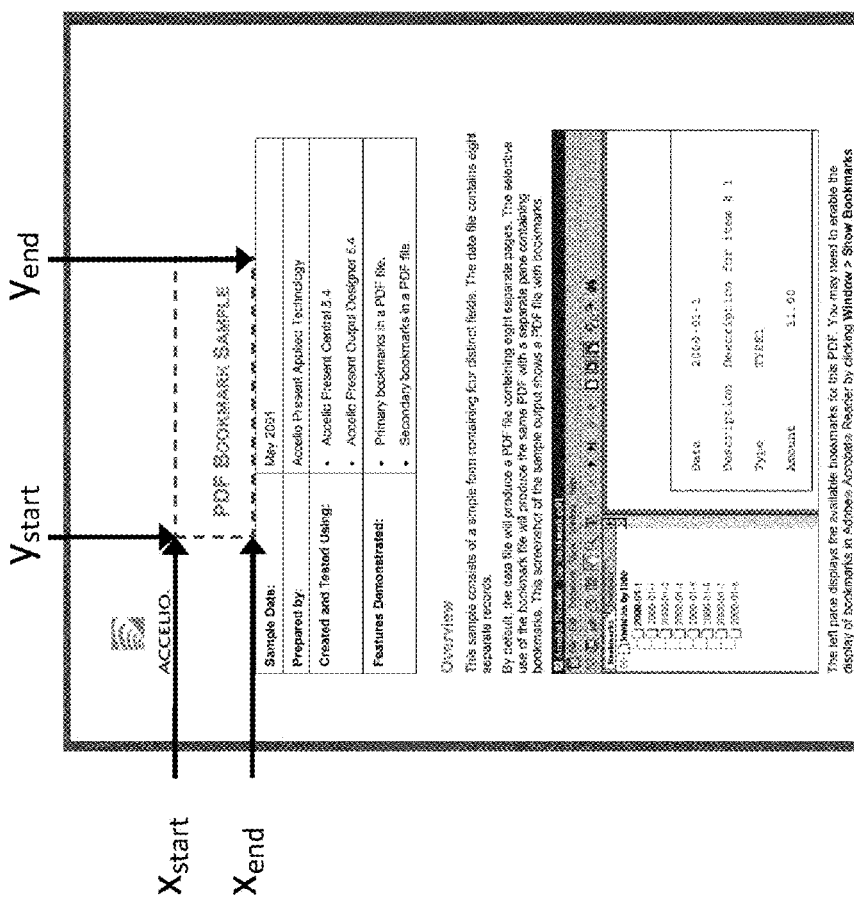

FIG. 3 illustrates how position embeddings can be generated by way of a bounding boxes principle. For each word or token, the corresponding coordinates (based on the upper and lower start and end points) are detected, thereby providing a bounding box (defined by the coordinates $x_{start}$, $y_{start}$, $x_{end}$ and $y_{end}$) for the word or token. Further, some selected meta data, such as e.g. the page number (Page #) and the document number (Doc #) can be also included in the position embedding (illustrated on the right side of FIG. 3).

Figure 4:
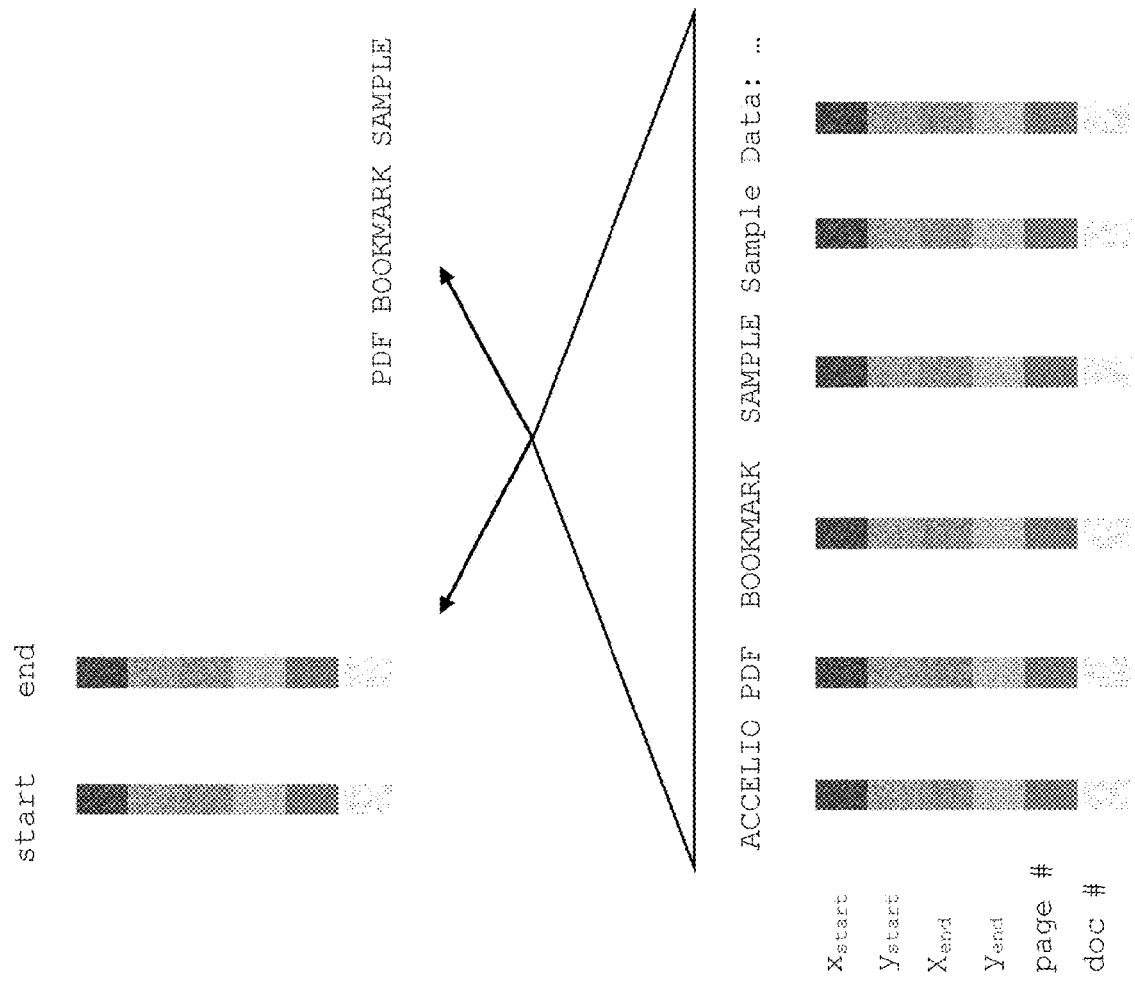
FIG. 4: Exemplary use of position embeddings with the embeddings of corresponding words.
Figure 4:
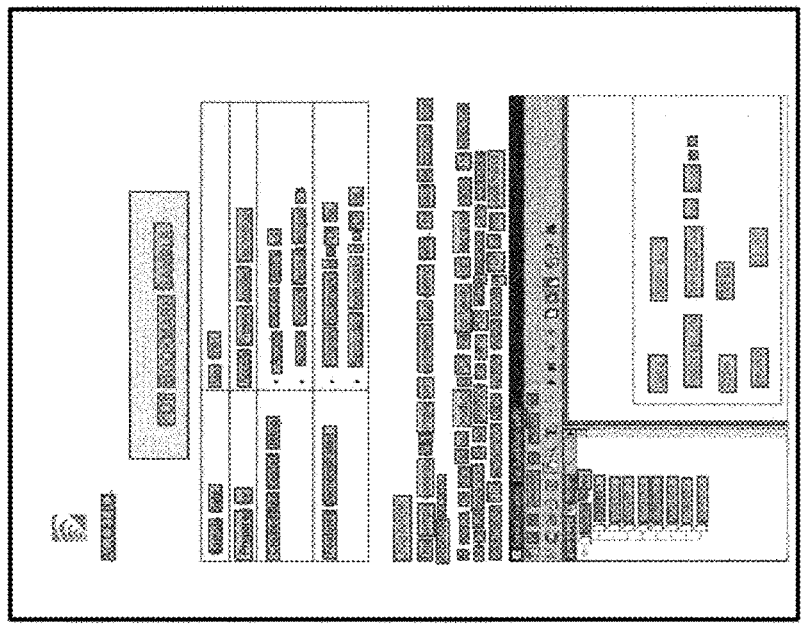

FIG. 4 illustrates how the position embeddings are used together with the embeddings of the respective word or token, i.e as vector representations of the word (or token). The vector representations are run through the system to predict the output text, i.e. the output of the generator ("PDF BOOKMARK SAMPLE" in this example). Optionally, the system may also provide the sequence of the input text from where the answer was taken as output positions, i.e. a bounding box of where the info for the answer came from. Accordingly, it is possible to not just generate the answer but also a bounding box for the text that led the system to generate the answer.

Figure 5:
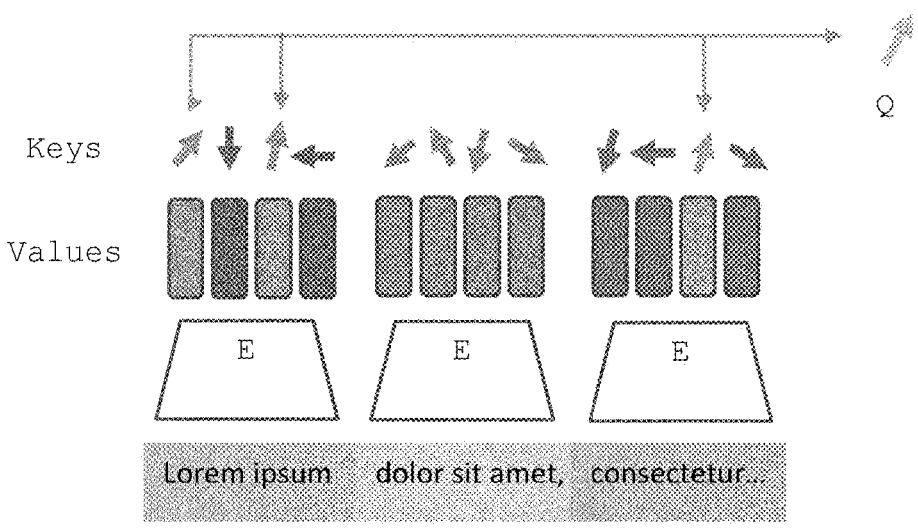
FIG. 5: General outline of information retrieval.

FIG. 5 is a general outline of the information retrieval in a system according to the invention. In a first step, with the use of encoders, embeddings are generated. Next, values and keys for each embedding are generated. Thereafter, a key vs. query comparison is carried out, e.g by way of a K-nearest Neighbours approach (KNN).

Figure 6:
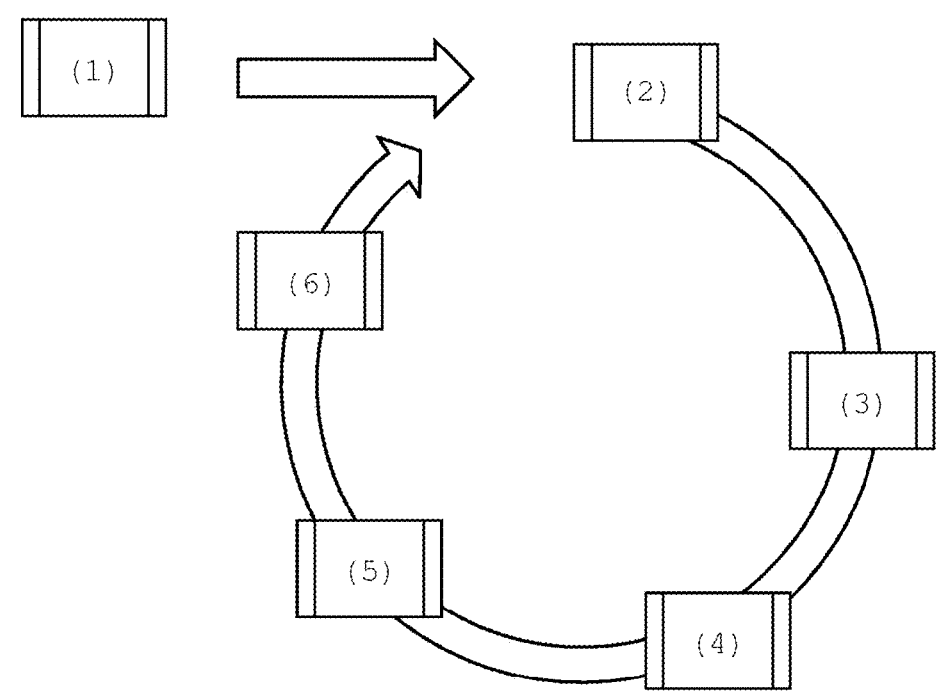
FIG. 6: Exemplary retrieval diagram.

FIG. 6 shows an exemplary retrieval diagram.

In step (1), input text is embedded, i.e. words are turned into vector representations, and a key value pair is produced for every single embedding.

In step (2), a set of queries is produced from an embedded text input, which contains a question to answer or an instruction to execute. Key value pairs are produced the queries, too.

In step (3), the keys that were generated for the input text are compared with the keys that were generated for the queries to identify the most similar matches, using a K-Nearest Neighbour distance measure for the similarity measurement.

In step (4), the values from the keys are taken that were identified to be the most similar. The values are passed on for further processing.

In step (5), the status of the retriever is updated by jointly reasoning over the previously held information and the new information that was gathered in step (4).

In step (6), it is checked whether the information is (already) sufficient to answer the initial question or to execute the initial instruction. It is then determined whether the process ends or whether another set of (sub-) queries must be answered to conclude the reasoning process.

Speedup Test

The advantages of a system according to the invention are apparent from the following test. The execution times of a system according to the invention were compared with a standard Albert base model (arXiv: 1909.11942v6).

For the Albert model, a question answering head and a sliding window approach were used. The same procedure was also implemented by the authors of the Albert paper referred to above (cf. https://github.com/google-research/albert). For the system according to the invention, the model and the tokenizer from the hugginface transformer library were used (arXiv: 1910.03771v5).

The inference process was performed as outlined above.

As the input text for the models, the text of 100 random Squad v2 (arXiv: 1806.03822v1) samples was concatenated, resulting in a text consisting of 69'505 characters. For the queries, questions from the selected Squad samples were sampled. The same input was used for both models.

All measurements were conducted on a Nvidia DGX 1, while using one GPU. The results were as follows:

| # queries | Albert | New model | Speedup |
| --- | --- | --- | --- |
| 1 | 6.8 | 2.46 | 2.76 |
| 5 | 11.59 | 2.62 | 4.42 |
| 10 | 17.87 | 2.69 | 6.64 |
| 20 | 27.22 | 2.8 | 9.72 |
| 40 | 52.38 | 3.02 | 17.34 |
| 80 | 95.93 | 3.41 | 28.13 |

The above results show that the system according to the invention is much more efficient than a prior art system. Moreover, the more queries the more speedup can be achieved, which is of utmost practical relevance.

The invention claimed is:

1. A system for the extraction of information from documents, the system comprising:

one or more processors; and a non-transitory computer readable medium storing a plurality of instructions, which when executed, cause the one or more processors to:

receive user-defined queries for at least two pieces of information;

apply an encoder to the documents to generate document encodings comprising vector embeddings and to the user-defined queries to generate encoded instructions comprising vector embeddings, the encoder comprising a neural network;

query the document encodings by a retriever in look-up steps based on the encoded instructions, the retriever being configured as a reasoning engine and the querying comprising:

i) searching for information in the look-up steps that is most relevant for the encoded instructions, ii) reasoning over findings of the look-up steps, iii) repeating steps (i) and (ii) for each encoded instruction, and iii) producing a condensed representation of the output of step (ii); and generating, by a generator, a semantic response to the user-defined queries based on the condensed representation of the retriever.

2. The system according to claim 1, wherein two or more encoders are used to generate the document encodings.

3. The system according to claim 1, wherein the document encodings are based on embeddings, and key/value pairs derived therefrom.

4. The system according to claim 1, configured such that the retriever is only used once for each encoded instruction.

5. The system according to claim 1, configured such that the document encodings are generated only once, for the document encodings to be queried by the retriever to answer the user-defined queries for the at least two pieces of information.

6. The system according to claim 1, configured such that the retriever produces a query that can be used to search for yet missing information.

7. The system according to claim 1, configured such that the generator is only used once for creating a response to each encoded instruction.

8. The system according to claim 1, wherein the generator is further configured to generate a bounding box defining coordinates within the document corresponding to text used to generate the semantic response, and to cause the bounding box to be displayed on a user interface of a display.

9. A computer-implemented method for extraction of information for documents based on user-defined queries for at least two pieces of information, comprising the steps of:

i) providing at least one document;

ii) applying an encoder with a neural network, to a. the documents to generate document encodings comprising vector embeddings;

b. the user-defined queries, to generate encoded instructions comprising vector embeddings iii) querying the document encodings by a retriever in look-up steps based on the encoded instructions, the retriever being configured as a reasoning engine and the querying comprising:

a. searching for information in the look-up steps that is most relevant for the encoded instructions, b. reasoning over findings of the look-up steps, c. repeating steps (iii)(a) and (iii)(b) for each encoded instruction, and d. producing a condensed representation of the output of step (iii)(b); and iv) generating, by a generator, a semantic response to the user-defined queries based on the condensed representation of the retriever.

10. The method according to claim 9, further comprising:

generating a bounding box defining coordinates within the document corresponding to text used to generate the semantic response; and causing presentation of the bounding box on a user interface of a display.

\*   \*   \*   \*   \*